United States Patent
Chen et al.

(10) Patent No.: US 9,645,734 B2
(45) Date of Patent: May 9, 2017

(54) OPTICAL TOUCH DEVICES AND OPERATION METHOD THEREOF

(71) Applicant: WISTRON CORP., New Taipei (TW)

(72) Inventors: Shih-Wen Chen, New Taipei (TW); Shou-Te Wei, New Taipei (TW)

(73) Assignee: Wistron Corp., New Taipei (TW)

( * ) Notice: Subject to any disclaimer, the term of this patent is extended or adjusted under 35 U.S.C. 154(b) by 177 days.

(21) Appl. No.: 14/061,716

(22) Filed: Oct. 23, 2013

(65) Prior Publication Data

US 2014/0139487 A1    May 22, 2014

(30) Foreign Application Priority Data

Nov. 21, 2012  (TW) .............................. 101143379 A
Nov. 21, 2012  (TW) .............................. 101143381 A

(51) Int. Cl.
*G06F 3/042* (2006.01)
*G06F 3/0488* (2013.01)
*G06F 3/041* (2006.01)

(52) U.S. Cl.
CPC ........ *G06F 3/04883* (2013.01); *G06F 3/0416* (2013.01); *G06F 3/0428* (2013.01)

(58) Field of Classification Search
CPC ...... G06F 3/041–3/047; G06F 3/04883; G06F 3/0416; G06F 3/0428
See application file for complete search history.

(56) References Cited

U.S. PATENT DOCUMENTS

| | | | |
|---|---|---|---|
| 2006/0227116 A1* | 10/2006 | Zotov et al. | 345/173 |
| 2010/0201639 A1* | 8/2010 | Huang et al. | 345/173 |
| 2011/0102464 A1* | 5/2011 | Godavari | G06F 3/0416 345/650 |
| 2011/0122099 A1 | 5/2011 | Zhu et al. | |
| 2012/0327031 A1* | 12/2012 | Fujioka | 345/175 |

FOREIGN PATENT DOCUMENTS

TW   201030579 A1   8/2010

OTHER PUBLICATIONS

Taiwan Patent Office, Office Action, Patent Application Serial No. 101143379, Sep. 5, 2014, Taiwan.
China Patent Office, Office Action, Patent Application Serial No. 201210549005.0, Feb. 29, 2016, China.

* cited by examiner

*Primary Examiner* — Matthew Sim

(57) ABSTRACT

An embodiment of the disclosure provides an operation method for an optical touch device. The optical touch device includes a panel, a left-side sensor and a right-side sensor. The operation method includes the steps of: sensing a sensing waveform on the panel; determining the number of peaks of the sensing waveform to control the optical touch device to be switched to a gesture mode or a touch mode; estimating a first variance according to a first sensing waveform sensed by the left-side sensor and a second variance according to a second sensing waveform sensed by the right-side sensor when the optical touch device is operating in the gesture mode; and determining the gesture made by the user according to the first variance and the second variance.

15 Claims, 11 Drawing Sheets

OPTICAL TOUCH DEVICES AND OPERATION METHOD THEREOF

CROSS REFERENCE TO RELATED APPLICATIONS

This Application claims priority of Taiwan Patent Application No. 101143379, filed on Nov. 21, 2013, and Taiwan Patent Application No. 101143381, filed on Nov. 21, 2013, the entirety of which are incorporated by reference herein.

BACKGROUND

Field of the Disclosure

The disclosure relates to an optical touch device, and more particularly to an optical touch device with a gesture-recognition mechanism.

Description of the Related Art

Recently, due to developments in optical touch-panel technology, the interactions between the optical touch panel and the user can be implemented by the user's fingers. Some of the current optical touch devices can support touch operations implemented by one or two user's fingers, and some can support gesture operations implemented by more than three of the user's fingers. Optical touch devices that can support both touch and gesture operations require the user to perform some additional operations to switch between the two modes, and this is not convenient for the user.

BRIEF SUMMARY OF THE DISCLOSURE

An embodiment of the disclosure provides an operation method for an optical touch device. The optical touch device includes a panel, a left-side sensor and a right-side sensor. The operation method includes the steps of: sensing a sensing waveform on the panel; determining the number of peaks of the sensing waveform to control the optical touch device to be switched to a gesture mode or a touch mode; estimating a first variance according to a first sensing waveform sensed by the left-side sensor and a second variance according to a second sensing waveform sensed by the right-side sensor when the optical touch device is operating in the gesture mode; and determining the gesture made by the user according to the first variance and the second variance.

Another embodiment of the disclosure provides an optical touch device including a panel, a left-side sensor, a right-side sensor and a gesture determination unit. The left-side sensor disposed on the left side of the panel senses a first waveform. The right-side sensor is disposed on the right side of the panel to sense a second waveform. The gesture determination unit determines the gesture made by the user according to the first waveform and the second waveform. A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims. In the description, the unit, module or other similar terms may be implemented by hardware or may be a program, software or a part of codes executed by a processor or controller.

Figure 1:
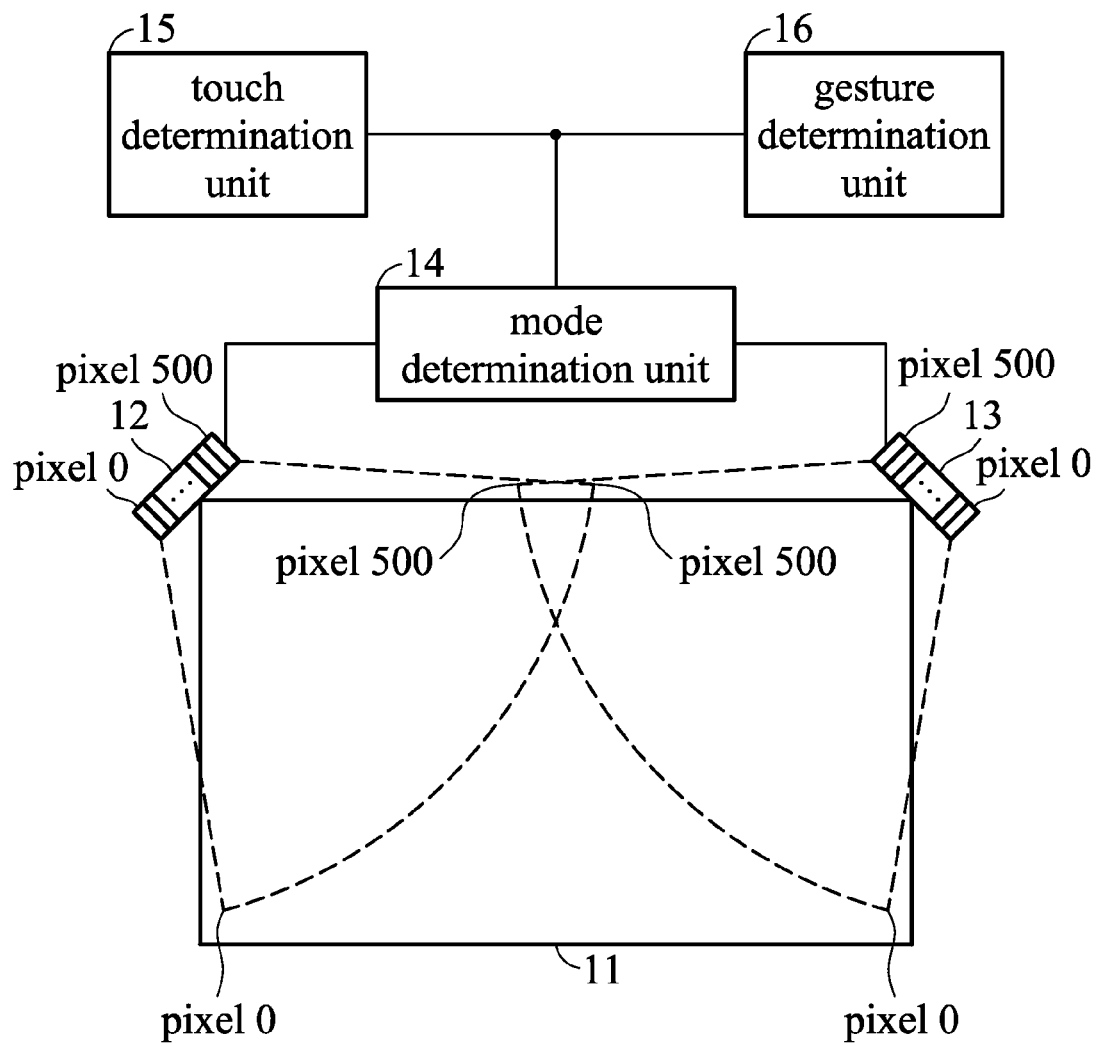
FIG. 1 is an optical touch device according to an embodiment of the disclosure.

FIG. 1 is an optical touch device according to an embodiment of the disclosure. In FIG. 1, the optical touch device 1 comprises a panel 11, a left-side sensor 12, a right-side sensor 13, a mode determination unit 14, a touch determination unit 15 and a gesture determination unit 16. When the optical touch device 1 is in operation, the user uses an object to contact the panel 11 to control the optical touch device 1 via touch or gesture. The object may be the user's finger or a stylus. In the embodiment of the disclosure, the object is illustrated with the user's finger. In the embodiment, the mode determination unit 13, the touch determination unit 15 and the gesture determination unit 16 are implemented by hardware circuitry or programs or software executed by a processor or a controller.

Generally speaking, the optical touch devices can be classified as two types, the retro-reflective type and the photo interrupt type. In one photo interrupt type of optical touch device, the panels are surrounded by reflective materials. When the user's finger touches the panel, the lightness of the touch position on the panel decreases. In the retro-reflective type, the panel is surrounded by light-diffusion materials. When the user's finger touches the panel, the lightness of the touch position on the panel increases.

When the optical touch device 1 operates, the left-side sensor 12 and the right-side sensor 13 are used to sense the brightness of the panel 11 and output a corresponding sensing waveform. Please refer to FIG. 2A. When the optical touch device 1 operates and the panel 11 is not touched yet, the waveform S11 is an initial waveform of the left-side sensor 12, wherein the horizontal axis represents the pixel of the left-side sensor, and the vertical axis represents the strength of the light sensed by the corresponding pixel of the left-side sensor 12. The mode determination unit 14 sets a threshold waveform STH, wherein the strength of the light of each pixel on the waveform STH is smaller than the strength of the corresponding pixel on the initial waveform S11. In one embodiment, the strength of the light of each pixel on the waveform STH is 0.75 times the strength sensed by the corresponding pixel on the initial waveform S11.

Note that the pixel of the sensor is actually a sensing unit of the sensor. In other words, take FIG. 1 for example, pixel 0 to pixel 500 represent sensor unit 0 to sensing unit 500.

Figure 2B:
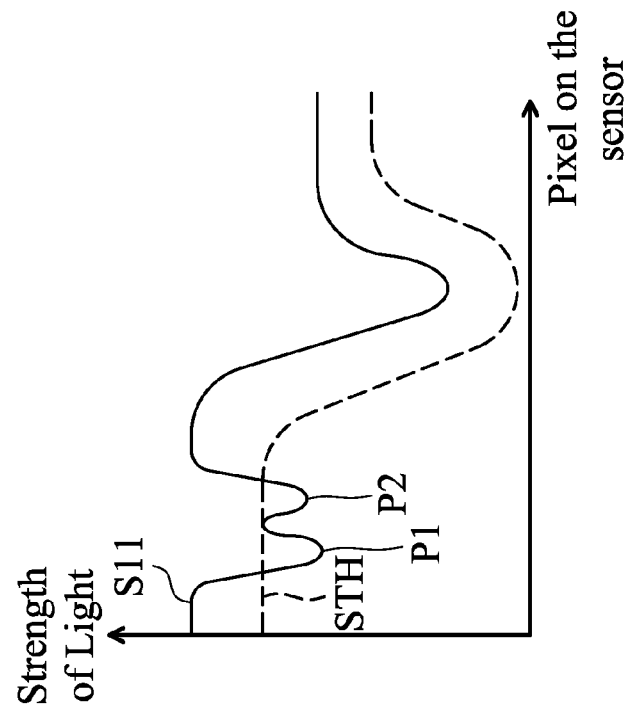
FIG. 2B is a schematic diagram showing a waveform sensed by the optical touch device when detecting operation by the user.
Figure 2A:
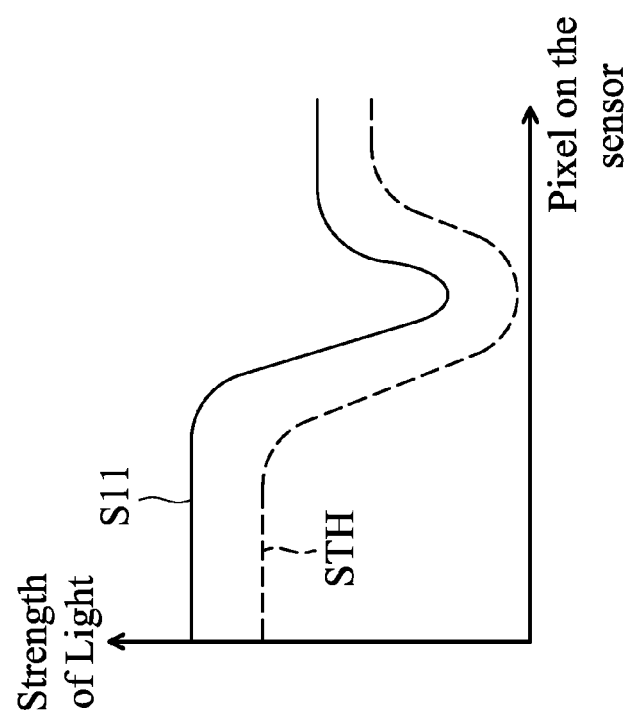
FIG. 2A is a schematic diagram showing an initial waveform sensed by the optical touch device.

When the user uses two fingers to touch the panel 11, two peaks P1 and P2 corresponding to the two fingers are generated on the sensing waveform S11, as shown in FIG. 2B. Thus, the mode determination unit 14 can determine the number of fingers that touch the panel 11 according to the number of peaks detected. The mode determination unit 14 generates a switch signal according to the determination result and a controller switches the optical touch device 1 to a gesture mode or a touch mode according to the switch signal. In other words, the embodiment determines the optical touch device 1 is operating in the gesture mode or the touch mode according to the number of fingers touching the panel 11.

In this embodiment, the optical touch device 1 is operated in the gesture mode when three or more fingers are touching the panel 11, and the optical touch device 1 is operated in the touch mode when only one or two fingers are touching the panel 11. When the optical touch device 1 is operated in the gesture mode, the signals sensed by the left-side sensor 12 and the right-side sensor 13 are transmitted to the gesture determination unit 16 to determine the user's gestures. When the optical touch device 1 is operated in the touch mode, the signals sensed by the left-side sensor 12 and the right-side sensor 13 are transmitted to the touch determination unit 15 to determine the position of the user's touch.

Figure 3:
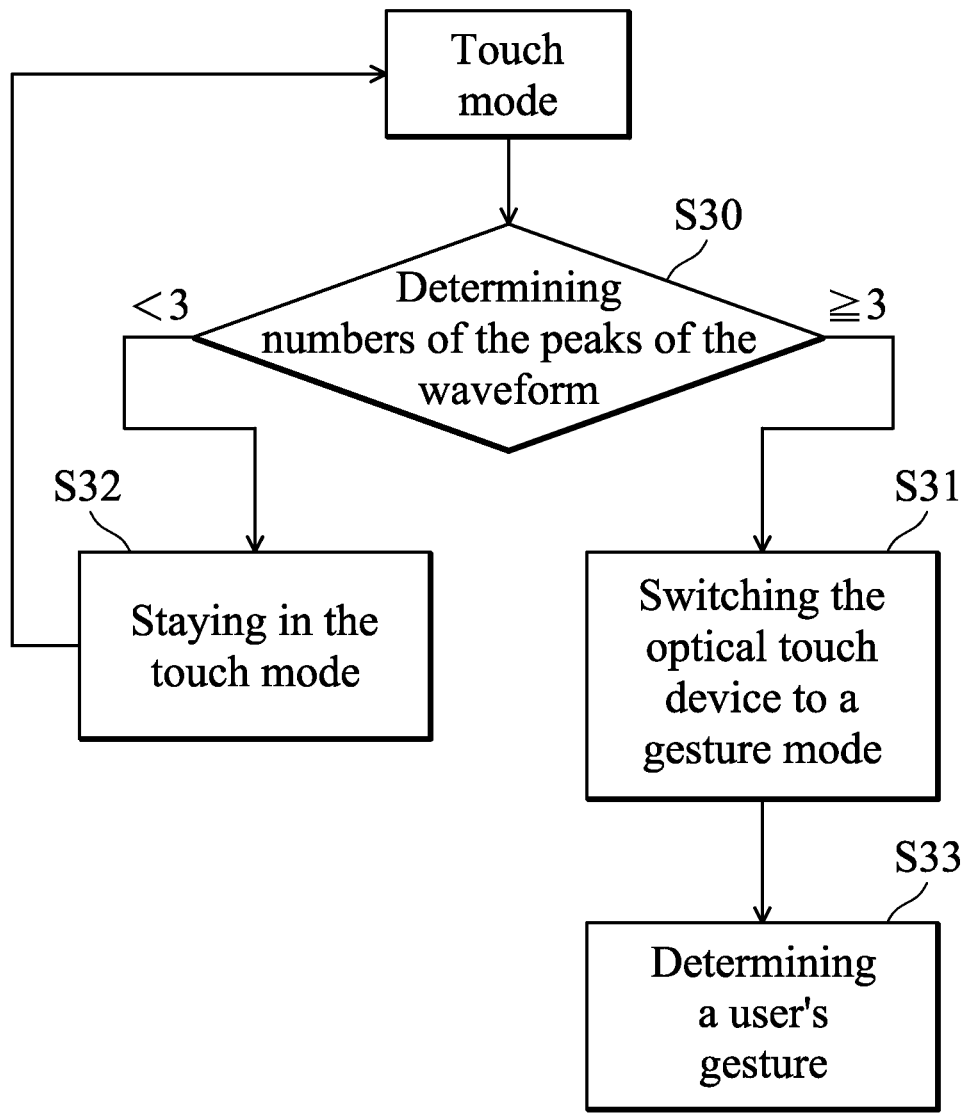
FIG. 3 is a flowchart of an operation method of an optical touch device according to an embodiment of the disclosure.

FIG. 3 is a flowchart of an operation method of an optical touch device according to an embodiment of the disclosure. The operation method is illustrated in FIG. 1 and FIG. 3. The switch method shown in FIG. 3 is illustrated with the situation where the optical touch device 1 is operated in the touch mode. When the optical touch device 1 is operated in the touch mode, the mode determination unit 13 determines the number of peaks of the waveform sensed by the left-side sensor 12 and by the right-side sensor 13 (step S30). In one embodiment, the mode determination unit 14 only determines the number of peaks on the waveform sensed by the left-side sensor 12 or the right-side sensor 13.

When the mode determination unit 14 determines that the number of peaks on the waveform sensed by the left-side sensor 12 or the right-side sensor 13 is greater than or equal to 3 (or a predetermined value), it represents the user currently using at least three fingers to touch the panel 11. The mode determination unit 14 then transmits a switch signal to inform the controller to switch the optical touch device to a gesture mode (step S31). Then, in step S33, the gesture determination unit 16 determines the user's gesture according to the waveforms sensed by the left-side sensor 12 and the right-side sensor 13

When the mode determination unit 14 determines the number of peaks on the waveform sensed by the left-side sensor 12 or the right-side sensor 13 is less than 3, it represents the user using only one finger or two fingers to touch the panel 11, and the mode determination unit 14 transmits the switch signal to maintain the optical touch device 1 in a touch mode (step S32). When operating in the touch mode, the touch determination unit 15 determines the position of the user's touch according to pixels on the left-side sensor 12 and the right-side sensor 13 corresponding to the peaks of the waveforms sensed by the left-side sensor 12 and the right-side sensor 13.

Figure 4:
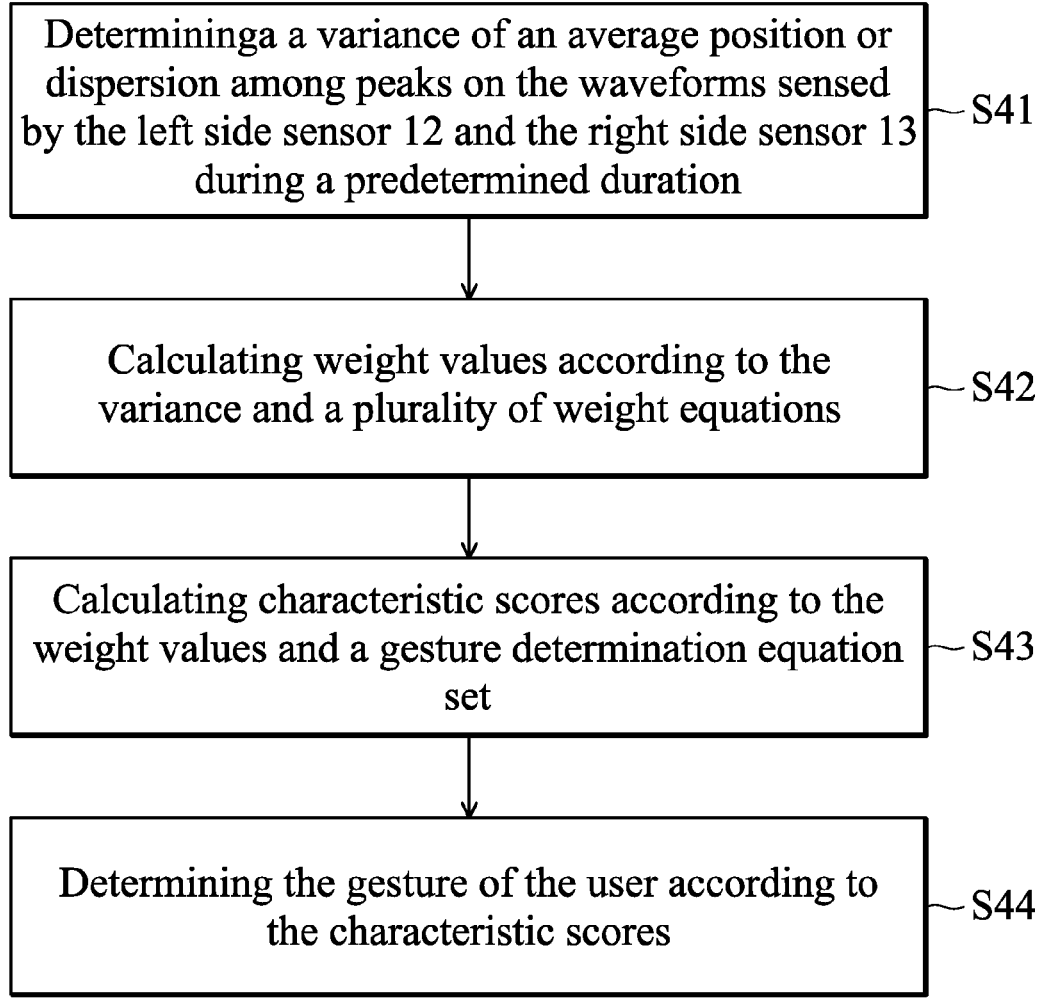
FIG. 4 is a flowchart of an embodiment of a gesture determination method according to the disclosure.

FIG. 4 is a flowchart of an embodiment of a gesture determination method according to the disclosure. The embodiment of the gesture determination method is executed by the gesture determination unit 16. In one embodiment, the gesture determination unit 16 includes a touch position determination unit to determine roughly the position of the user's touch. Furthermore, the touch determination unit 15 can determine a more precise position than the touch position determination unit embedded in the gesture determination unit 16. In step S41, the gesture determination unit 16 determines the variance among peaks on the waveforms sensed by the left-side sensor 12 and the right-side sensor 13 during a predetermined duration.

For example, assuming the left-side sensor 12 detects three peaks, and detects the positions P1, P2 and P3 corresponding to the user's fingers on the panel 11. The variance is an average of the squares of the differences between a mean position to the positions P1, P2 and P3. The variance can be expressed as the equation:

$$\theta^2 = \frac{\sum (x_i - \sigma)^2}{N},$$

wherein θ is the variance, Xi is the position of each peak, σ is an average position of peaks and N is the number of peaks.

In another case, the variance can be estimated in other ways. Assuming the left-side sensor 12 detects the positions of three of the user's fingers corresponding to pixels 150, 180 and 240. The variance can be expressed as follows:

(240−150)/500=0.18

Figure 5:
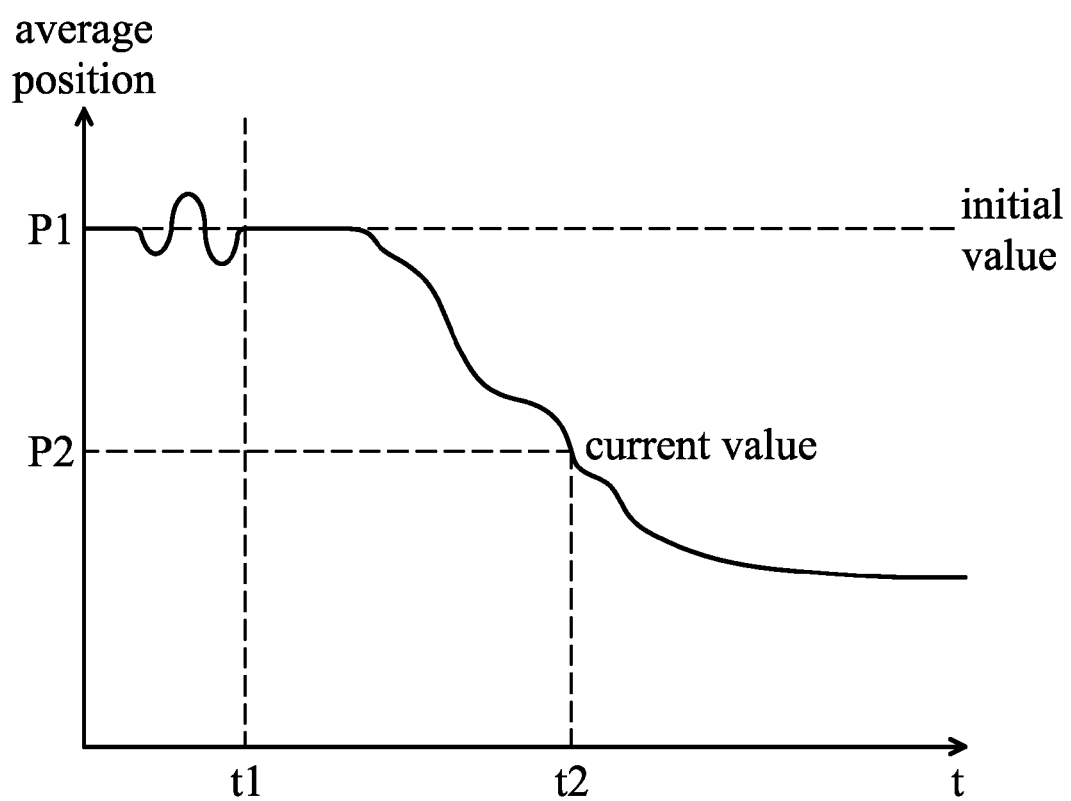
FIG. 5 is a schematic diagram showing an average position corresponding to a gesture and a time.

In another embodiment, the variance can be estimated according to the variances of the mean positions. In the embodiment, the predetermined time (or duration) means a time period beginning when detecting a gesture and ending when not detecting the gesture. In this embodiment, the left-side sensor 12 and the right-side sensor 13 have a sensing frame rate, and the left-side sensor 12 and the right-side sensor 13 sense the user's gesture in each frame. The gesture determination unit 16 calculates the average position according to the finger position in each frame. Please refer to FIG. 5. FIG. 5 is a schematic diagram showing an average position corresponding to a gesture and a time. When detecting the gesture, the gesture determination unit 16 first waits for a predetermined time duration t1, and estimates an initial position P1 where the user's gesture is on the panel 11 at the time point t1. At the time point t2, the gesture determination unit 16 determines the user's gesture is finish and estimates a current position P2 where the user's gesture is on the panel 11 at the time point t2. Then, the gesture determination unit 16 calculates the average position variance:

Variance=(P2−P1)/P1

Figure 6A:
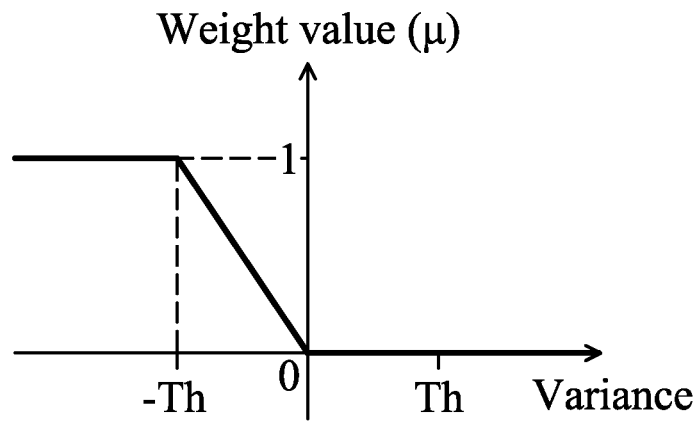
FIGS. 6A to 6D show schematic diagrams of weight equations.
Figure 6B:
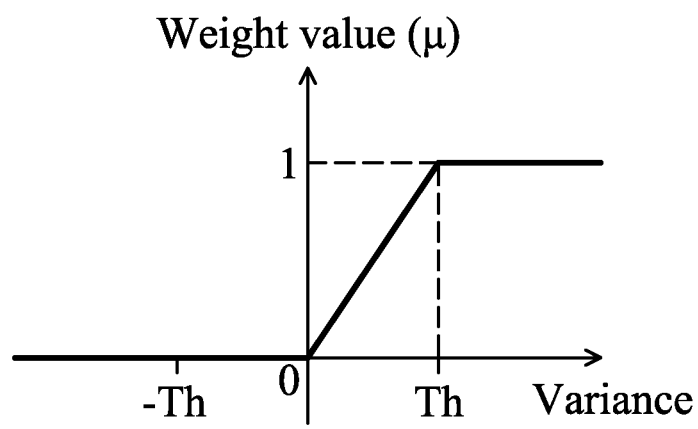
Figure 6C:
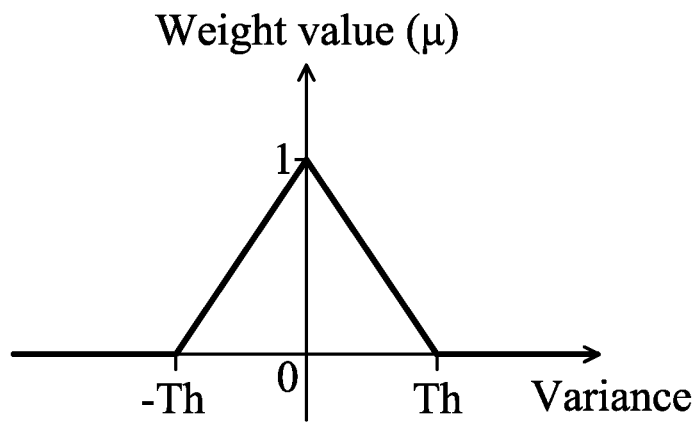
Figure 6D:
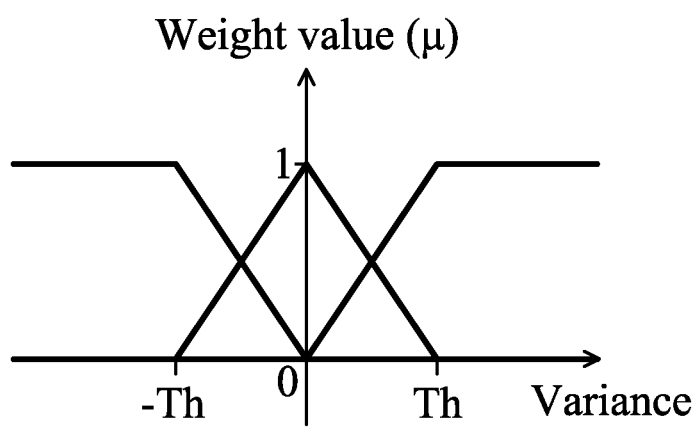

In step S42, the gesture determination unit 16 calculates a plurality of weight values according to the variance and a weight equation set having a plurality of weight equations. The weight equations can be referred to in FIGS. 6A~6D. The equations in FIG. 6A predict that the user's gesture is moving downward when the equations in FIG. 6A are applied to the optical touch device 1 in FIG. 1. The equations in FIG. 6B predict that the user's gesture is moving upwardly when the equations in FIG. 6B are applied to the optical touch device 1 in FIG. 1. The equations in FIG. 6C predict that the user's gesture is maintained in a fixed position when the equations in FIG. 6C are applied to the optical touch device 1 in FIG. 1. FIG. 6D is a schematic diagram of an equation set including the equations described above.

The FIGS. 6A~6C can be represented by equations. For example, FIG. 6A can be represented by the following equations:

$$\mu = \begin{cases} 0, & v \geq 0 \\ 1, & v \leq -Th \\ v/(-Th), & -Th < v < 0, \end{cases}$$

wherein μ is the weight value and v is the variance.

The gesture determination unit 16 calculates a first variance according to the sensing result of the left-side sensor 12 and a second variance according to the sensing result of right-side sensor 13. The gesture determination unit 16 substitutes the first variance and the second variance into a weight equation set, such as that shown in FIG. 6D, to calculate a plurality of weight values corresponding to different weight equation. Moreover, to avoid error determination, the equations shown in FIGS. 6A~6D set two thresholds and the gesture determination unit 16 determines gestures only when the calculated variance is between the two thresholds.

In step S43, the gesture determination unit 16 calculates a plurality of characteristic scores according to the weight values and a gesture-determination equation set. The operation is discussed in detail in the following.

The gesture determination unit 16 substitutes the first variance into the equation shown in FIG. 6A to get a first weight value $\mu 1$, substitutes the first variance into the equation shown in FIG. 6B to get a second weight value $\mu 2$, and substitutes the first variance into the equation shown in FIG. 6C to get a third weight value $\mu 3$. The gesture determination unit 15 substitutes the second variance into the equation shown in FIG. 6A to get a fourth weight value $\mu 4$, substitutes the second variance into the equation shown in FIG. 6B to get a fifth weight value $\mu 5$, and substitutes the second variance into the equation shown in FIG. 6C to get a sixth weight value $\mu 6$.

The gesture-determination equation set comprises gesture-determination equations, and each gesture-determination equation corresponds to a gesture. Please refer to FIG. 1. When the user's gesture moves upwardly, the number of the pixel sensing the user's gesture of the left-side sensor 12 increases, and the number of the pixel sensing the user's gesture of the right-side sensor 13 also increases. The equation to calculate a characteristic score of an upwardly-moving gesture can be expressed as follows:

$$E1 = \mu_{\_left\_increase} \times \mu_{\_right\_increase}$$

The value $\mu_{\_left\_increase}$ is acquired by substituting the variance of the mean positions sensed by the left-side sensor 12 into the equation shown in FIG. 6B. The value $\mu_{\_right\_increase}$ is acquired by substituting the variance of the mean positions sensed by the right-side sensor 13 into the equation shown in FIG. 6A.

When the user's gesture is moving downward, the number of pixel, sensing the user's gesture, of the left-side sensor 12 decreases, and the number of pixel, sensing the user's gesture, of the right-side sensor 13 also decreases. The equation to calculate a characteristic score of a downward-moving gesture can be expressed as follows:

$$E2 = \mu_{\_left\_decrease} \times \mu_{\_right\_decrease}$$

The value $\mu_{\_left\_decrease}$ is acquired by substituting the variance of the mean positions sensed by the left-side sensor 12 into the equation shown in FIG. 6A. The value $\mu_{\_right\_decrease}$ is acquired by substituting the variance of the mean positions sensed by the right-side sensor 13 into the equation shown in FIG. 6A.

When the user's gesture is moving to left, the number of the pixel sensing the user's gesture of the left-side sensor 12 decreases, and the number of the pixel sensing the user's gesture of the right-side sensor 13 increases. The equation to calculate a characteristic score of a left-moving gesture can be expressed as follows:

$$E3 = \mu_{\_left\_decrease} \times \mu_{\_right\_increase}$$

The value $\mu_{\_left\_decrease}$ is acquired by substituting the variance of the mean positions sensed by the left-side sensor 12 into the equation shown in FIG. 6A. The value $\mu_{\_right\_increase}$ is acquired by substituting the variance of the mean positions sensed by the right-side sensor 13 into the equation shown in FIG. 6B.

When the user's gesture is moving to the right, the number of the pixel sensing the user's gesture of the left-side sensor 12 increases, and the number of the pixel sensing the user's gesture of the right-side sensor 13 decreases. The equation to calculate a characteristic score of a right-moving gesture can be expressed as follows:

$$E4 = \mu_{\_left\_increase} \times \mu_{\_right\_decrease}$$

The value $\mu_{\_left\_increase}$ is acquired by substituting the variance of the mean positions sensed by the left-side sensor 12 into the equation shown in FIG. 6B. The value $\mu_{\_right\_decrease}$ is acquired by substituting the variance of the mean positions sensed by the right-side sensor 13 into the equation shown in FIG. 6A.

According to the above description, a gesture-determination equation set can be represented as follows:

$$E1 = \mu_{\_left\_increase} \times \mu_{\_right\_increase}$$

$$E2 = \mu_{\_left\_decrease} \times \mu_{\_right\_decrease}$$

$$E3 = \mu_{\_left\_decrease} \times \mu_{\_right\_increase}$$

$$E4 = \mu_{\_left\_increase} \times \mu_{\_right\_decrease}$$

It should be noted that the gesture-determination equation set is generated based on the optical touch device 1 in FIG. 1. If the left-side sensor 12 and the right-side sensor 13 are different or placed in different locations, the gesture-determination equation set changes accordingly.

After calculating characteristic scores, the gesture determination unit 15 determines the user's gesture according to the characteristic scores. Please refer to the following descriptions.

Assuming $\mu_{\_left\_increase}$ is 0, $\mu_{\_left\_decrease}$ is 0.5, $\mu_{\_right\_increase}$ is 0, and $\mu_{\_right\_decrease}$ is 0.5, the weight values are substituted into the gesture-determination equation set and the calculated characteristic scores are listed in the following:

$$E1 = 0$$

$$E2 = 0$$

$$E3 = 0.25$$

$$E4 = 0$$

The characteristic score E3 is highest and the user's gesture is determined as a downwardly moving gesture.

Furthermore, to avoid errors in determination, the highest characteristic score is compared with a threshold value. If the characteristic score is not higher than the threshold value, an error determination may occur. The determination unit 15 determines the user's gesture again according to the signals sensed by the left-side sensor 12 and the right-side sensor 13.

Figure 7:
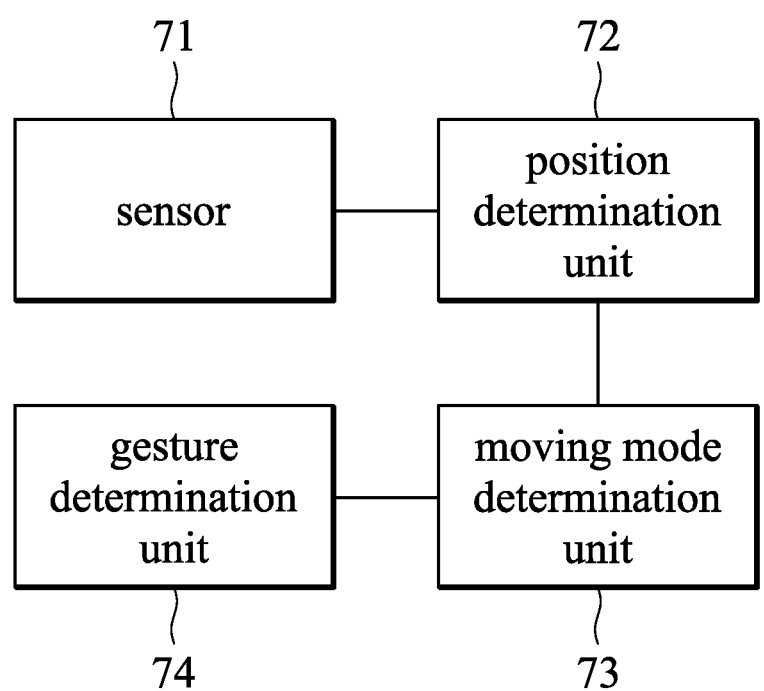
FIG. 7 is a schematic diagram of an embodiment of a gesture-sensing device.

FIG. 7 is a schematic diagram of an embodiment of a gesture-sensing device. The sensor 71 senses the user's gesture on the optical touch device to generate at least one sensing waveform. The position determination unit 72 receives the sensing waveform to estimate the variance of the average position of the user's gesture. A moving-mode determination 73 including a moving-mode equation set is provided. The moving-mode equation set includes a plurality of moving-mode equations corresponding to different moving modes. The moving-mode determination 73 substitutes the calculated variance into the moving-mode equation set to calculate a plurality of weight values. Then, a gesture determination unit 74 substitutes the weight values into a gesture-determination equation set to calculate characteristic scores and determines the user's gesture according to the characteristic scores.

It should be noted that the position determination unit 72, the moving-mode determination 73 and the gesture determination unit 74 shown in FIG. 7 can be integrated as the gesture determination unit 16 of FIG. 1.

Figure 8A:
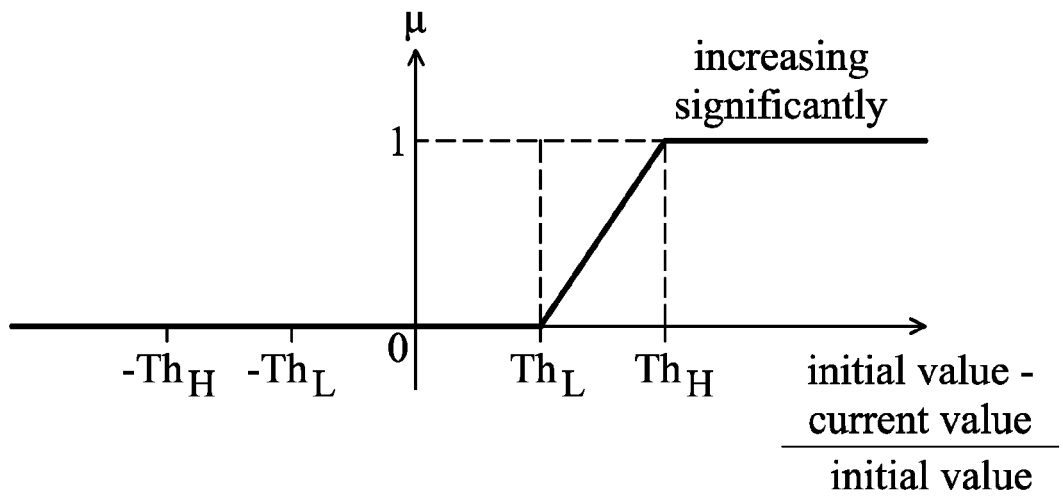
FIGS. 8A to 8E are schematic diagrams showing a plurality of moving-mode equations.

FIGS. 8A-8E are schematic diagrams showing a plurality of moving-mode equations. FIG. 8A is a schematic diagram of an equation showing the relationship between variance and a weight value when the user's gesture moves significantly. In FIG. 8A, the movement of the user's gesture on an optical touch device is larger than a predetermined value and moves upwardly. The variance of the average position of the user's gesture is therefore greater than a first threshold $Th_L$. The variance is substituted into the equation shown in FIG. 8A to calculate a weight value $\mu_{increasing\_significantly}$.

Figure 8B:
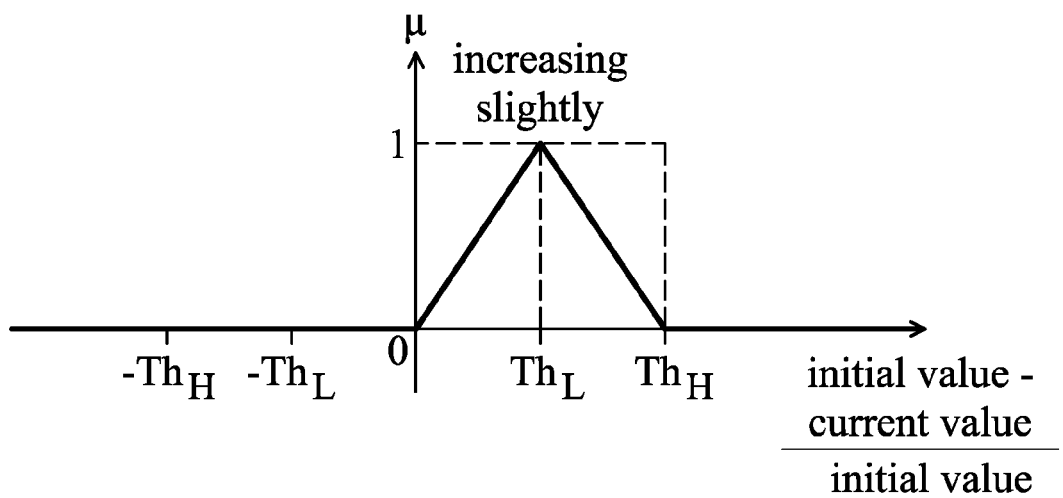

FIG. 8B is a schematic diagram of an equation showing the relationship between variance and a weight value when the user's gesture moves slightly. In FIG. 8A, the movement of the user's gesture on the optical touch device is less than the predetermined value and moves upwardly. The variance of the average position of the user's gesture is therefore less than the first threshold $Th_L$. The variance is substituted into the equation shown in FIG. 8B to calculate a weight value $\mu_{increasing\_slightly}$.

Figure 8C:
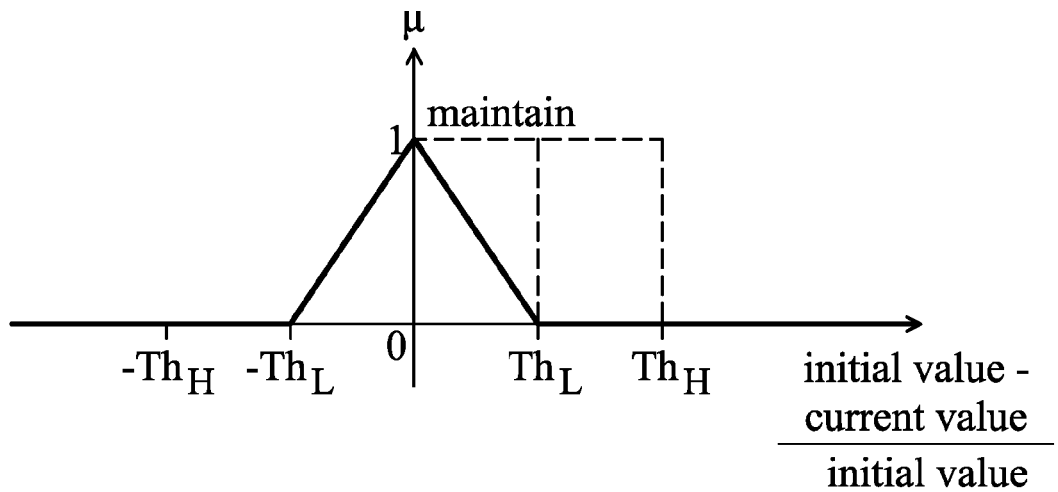

FIG. 8C is a schematic diagram of an equation showing the relationship between variance and a weight value when the user's gesture is maintained. In other words, the user's gesture may not move, and the variance of the average position of the user's gesture on the optical touch device is therefore less than the first threshold $Th_L$, but greater than a second threshold, $-Th_L$. The variance is substituted into the equation shown in FIG. 8C to calculate a weight value $\mu_{maintain}$.

Figure 8D:
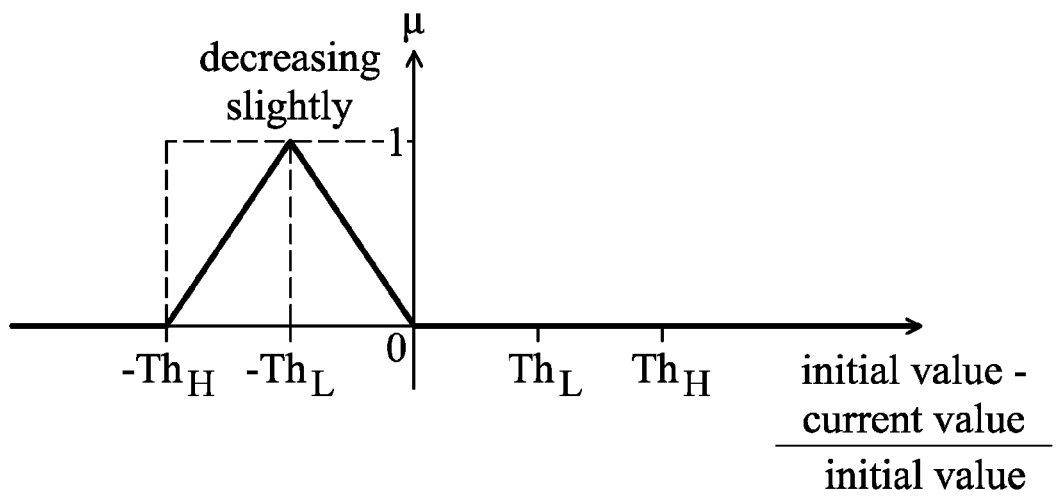

FIG. 8D is a schematic diagram of an equation showing the relationship between variance and a weight value when the user's gesture moves slightly. In FIG. 8A, the movement of the user's gesture on the optical touch device is less than the predetermined value and moves downward. The variance of the average position of the user's gesture may be greater than the second threshold, $-Th_L$. The variance is substituted into the equation shown in FIG. 8D to calculate a weight value $\mu_{decreasing\_slightly}$.

Figure 8E:
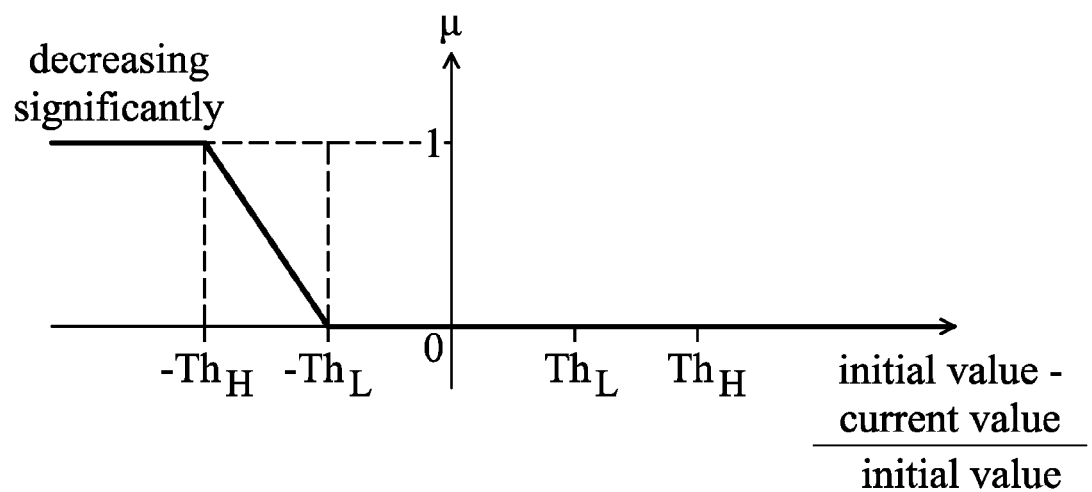

FIG. 8E is a schematic diagram of an equation showing the relationship between variance and a weight value when the user's gesture moves significantly. In FIG. 8A, the movement of the user's gesture on an optical touch device is larger than a predetermined value and moves downward. The variance of the average position of the user's gesture is therefore less than the second threshold, $-Th_L$. The variance is substituted into the equation shown in FIG. 8E to calculate a weight value $\mu_{decreasing\_significantly}$.

According to the description in the preceding paragraphs, a gesture-determination equation set is provided as follows:

$$\text{Score\_upward} = \mu_{increasing\_slightly\_left} \times \mu_{increasing\_slightly\_right}$$

$$\text{Score\_downward} = \mu_{decreasing\_slightly\_left} \times \mu_{decreasing\_slightly\_right}$$

$$\text{Score\_slight-to-left} = \mu_{decreasing\_slightly\_left} \times \mu_{increasing\_slightly\_right}$$

$$\text{Score\_slight-to-right} = \mu_{increasing\_slightly\_left} \times \mu_{decreasing\_slightly\_right}$$

$$\text{Score\_quickly-to-left} = \mu_{decreasing\_significantly\_left} \times \mu_{increasing\_significantly\_right}$$

$$\text{Score\_quickly-to-right} = \mu_{increasing\_significantly\_left} \times \mu_{decreasing\_significantly\_right}$$

$$\text{Score\_grasp} = \mu_{maintain\_left} \times \mu_{maintain\_right} \times \mu_{decreasing\_significantly\_left} \times \mu_{decreasing\_significantly\_right}$$

Assuming the variances acquired from the left-side sensor and the right-side sensor are $TH_L/4$, the weight values are shown as follows:

$$\mu_{increasing\_significantly\_left} = 0$$

$$\mu_{increasing\_significantly\_right} = 0$$

$$\mu_{increasing\_slightly\_left} = 0.25$$

$$\mu_{increasing\_slightly\_right} = 0.25$$

$$\mu_{maintain\_left} = 0.75$$

$$\mu_{maintain\_right} = 0.75$$

$$\mu_{decreasing\_slightly\_left} = 0$$

$$\mu_{decreasing\_slightly\_right} = 0$$

$$\mu_{decreasing\_significantly\_left} = 0$$

$$\mu_{decreasing\_significantly\_right} = 0$$

Furthermore, assuming the degree of dispersion of the peaks on the waveforms sensed by the left-side sensor and the right-side sensor are $-Th_H$, the weight values when the dispersion of peaks is significantly decreased are shown as follows:

$$\mu_{dispersion\_decreasing\_significantly\_left} = 1$$

$$\mu_{dispersion\_decreasing\_significantly\_right} = 1$$

Then, the above weight values are substituted into to a gesture-determination equation set to calculate characteristic scores. The calculated characteristic scores are as follows:

$$\text{Score\_upward} = 0.0625$$

$$\text{Score\_downward} = 0$$

$$\text{Score\_slight-to-left} = 0$$

$$\text{Score\_slight-to-right} = 0$$

$$\text{Score\_quickly-to-left} = 0$$

$$\text{Score\_quickly-to-right} = 0$$

$$\text{Score\_grasp} = 0.5625$$

The value of Score_grasp is highest among the characteristic scores, and higher than a predetermined value, such as 0.5. Thus, the user's gesture can be determined as an inward grasp gesture.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An operation method for an optical touch device comprising a panel, a left-side sensor and a right-side sensor, the method comprising:
   sensing a sensing waveform on the panel;
   determining a number of peaks of the sensing waveform;
   controlling the optical touch device to be switched to a gesture mode or a touch mode according to the number of peaks of the sensing waveform, wherein the number of peaks is equal to a number of objects which touch the panel;
   sensing a first sensing waveform by the left-side sensor and a second sensing waveform by the right-side sensor;
   when in the touch mode, determining a position of a user's touch according to pixels on the left-side sensor and the right-side sensor respectively corresponding to peaks of the first sensing waveform and the second sensing waveform;
   when in the gesture mode, estimating a first variance according to the first sensing waveform and a second variance according to the second sensing waveform during a predetermined duration, and determining a gesture made by the user according to the first variance and the second variance;
   wherein the first variance includes a degree of dispersion of peaks of the first sensing waveform, and the second variance includes a degree of dispersion of peaks of the second sensing waveform.

2. The method as claimed in claim 1, wherein the sensing waveform is one of the first or second sensing waveforms.

3. The method as claimed in claim 1, further comprising:
   when the operating in the gesture mode, substituting the first variance and the second variance into a movement equation set to calculate weight values; and
   determining the gesture made by the user according to the weight values.

4. The method as claimed in claim 3, wherein the movement equation set is generated according to the positions of the left-side sensor and the right-side sensor on the panel.

5. The method as claimed in claim 3, further comprising:
   when the operating in the gesture mode, substituting the weight values into a gesture-determination equation set to calculate characteristic scores; and
   determining the gesture made by the user according to the characteristic scores.

6. The method as claimed in claim 5, wherein a first characteristic score corresponding to the gesture is the maximum value of the characteristic scores.

7. The method as claimed in claim 5, further comprising:
   when the operating in the gesture mode, determining a maximum characteristic score among the feature values; and
   determining the gesture made by the user when the maximum characteristic score is higher than a threshold.

8. The method as claimed in claim 1, wherein when the number of peaks is less than 3, the optical touch device is operated in the touch mode, and when the number of peaks is greater than or equal to 3, the optical touch device is operated in the gesture mode.

9. An optical touch device, comprising:
   a panel;
   a left-side sensor disposed on the left side of the panel to sense a first waveform;
   a right-side sensor disposed on the right side of the panel to sense a second waveform;
   a mode determination unit to determine a number of peaks of at least one of the first waveform and the second waveform to control the optical touch device to operate in a gesture mode or a touch mode according to the number of peaks, wherein the number of peaks is equal to a number of objects which touch the panel;
   a touch determination unit to determine a position of a user's touch according to pixels on the left-side sensor and the right-side sensor respectively corresponding to peaks of the first waveform and the second waveform when the optical touch device is operated in the touch mode; and
   a gesture determination unit to determine the gesture made by the user according to the first waveform and the second waveform when the optical touch device is operated in the gesture mode, wherein the gesture determination unit estimates a first variance according to a first sensing waveform sensed by the left-side sensor and a second variance according to a second sensing waveform sensed by the right-side sensor during a predetermined duration, and determines the gesture made by the user according to the first variance and the second variance;
   wherein the first variance includes a degree of dispersion of peaks of the first sensing waveform, and the second variance includes a degree of dispersion of peaks of the second sensing waveform.

10. The device as claimed in claim 9, further comprising:
    a moving-mode determination unit including a moving-mode equation set to substitute the first variance and the second variance into the moving-mode equation set to calculate a plurality of weight values and determine the gesture made by the user according to the weight values.

11. The device as claimed in claim 10, wherein the moving-mode equation set is determined according to the positions of the left-side sensor and the right-side sensor on the panel.

12. The device as claimed in claim 10, further comprising:
    a gesture-determination equation set, wherein the gesture determination unit substitutes the weight values into the gesture-determination equation set to calculate characteristic scores and determine the gesture made by the user according to the characteristic scores.

13. The device as claimed in claim 12, wherein a first characteristic score corresponding to the gesture is a maximum among the characteristic scores.

14. The device as claimed in claim 12, wherein the gesture determination unit further determines whether a maximum characteristic score is higher than a predetermined value and the gesture determination unit determines the gesture made by the user when the maximum characteristic score is higher than a predetermined value.

15. The device as claimed in claim 9, wherein when the number of peaks is less than 3, the optical touch device is operated in the touch mode, and when the number of peaks is greater than or equal to 3, the optical touch device is operated in the gesture mode.

\* \* \* \* \*